on said shaft, a conduit for air leading through said casings to said gas pump and means for conveying oil to and from said oil pump, shaft bearings and gas pump to lubricate the same.

10. In combination, a motor having a rotatable shaft, a casing having a pump for gas and a pump for oil located therein and driven by said shaft, bearings for said shaft, an oil reservoir below the motor and constituting a support therefor, conduits formed in said casing leading to and from said pumps respectively and means comprising said oil pump for continuously supplying said bearings with oil when the motor is operating.

11. In combination, a motor having a rotatable shaft, a jack shaft, meshed gears between said shafts, a pump for gas and a pump for oil driven by said rotatable shaft, bearings for said shaft, a fan on said shaft, a shield for protecting the bearings of said shaft, an oil reservoir below the motor and constituting a support therefor, a conduit for air leading through the casing of the motor to said fan and said oil and gas pumps and in communication with the said oil reservoir to lubricate the same.

12. In combination, an electric motor having a casing comprising an end wall portion having a conduit therein, the outer side of said end wall being formed with a plane surface, a gear pump for oil comprising a plate having parallel sides formed with plane surfaces and one side of which abuts the plane surface of said end wall of the motor casing; a plate having a plane surface which abuts the plane surface of said gear pump plate and serves as a side wall for the gears of said pump, and having a conduit leading from the exterior wall of the plate to said gear pump; said motor having a shaft which extends through said end wall and plates and drives said pump, and means for holding said plates together and to said end wall of the motor casing, and in detachable relation therewith.

13. In combination, an electric motor having an end wall provided with a plane surface, a casing for pumps comprising a plurality of plates each of which is provided with plane surfaces which are held in abutting relation and in two of which are formed rotary pumps, the adjacent plates serving as side walls therefor, said motor having a shaft which extends through said plates and drives said pumps, and means for holding said plates to said end wall.

14. In combination, a motor having a rotatable shaft, a casing having bearings for said shaft and a conduit for oil leading to the end of said shaft in said casing, a rotary gas pump driven by said shaft, a gear pump for oil driven by said shaft and adapted to pump oil thru said conduit to lubricate said bearings and gas pump.

15. In combination, a motor having a rotatable shaft, a casing having bearings for said shaft and a conduit for oil leading to the end of said shaft in said casing, a rotary gas pump driven by said shaft, a rotary gear pump for oil driven by said shaft and adapted to pump oil thru said conduit to lubricate said bearings and gas pump, and a reservoir for oil in open communication with said conduit at both ends thereof.

In testimony whereof I have affixed my signature.

ALBERT E. GRANT.

Patented May 8, 1928.

1,669,050

UNITED STATES PATENT OFFICE.

ALBERT E. GRANT, OF NEW YORK, N. Y., ASSIGNOR TO GRANT ACCESSORIES CORPORATION, OF NEW YORK, N. Y., A CORPORATION OF DELAWARE.

ROTARY PUMP CONSTRUCTION.

Application filed April 21, 1927. Serial No. 185,533.

My invention relates to blowers and pumps of the rotary type.

The object of my invention is to provide a blower or pump construction adapted to pump fluids such as air or oil, and embodying means for lubricating the journals or bearings by a continuous circulation of oil, and means for preventing the lubricant from escaping through the bearings to the exterior of the casing construction.

A further object is to provide an electric motor for operating the pump, and constructed as an integral part thereof, and embodying means for cooling the armature of the said motor.

A further object is to provide a construction embodying the features above set forth, to occupy a small space and having no unnecessary parts; of low weight compared with previous constructions of this kind for the purpose set forth, and low in cost.

A further object is to provide a construction that is easy to assemble or take apart for inspection or repairs.

In the construction herein set forth, all of the qualities above referred to are attained.

Referring to the drawings which form a part of this specification,

Fig. 1 is a sectional elevational view of a construction embodying my invention.

Fig. 2 is a cross sectional view taken on lines 2—2 of Fig. 1, looking in the direction indicated by the arrow.

Fig. 3 is a cross sectional view taken on lines 3—3 of Fig. 1.

Fig. 4 is a plan view taken on lines 4—4 of Fig. 3.

A, indicates a casting of iron having flanges A' which are provided with holes A² through which bolts may extend to hold the casting to a floor or support.

The casting A, is formed with a chamber A³ to serve as a reservoir for oil, and with a top A⁴ having side saddle portions A⁵, the top and saddle portions being curved to conform to the curvature of the motor casing B, and forming a base therefor to support it at a height sufficient to clear the oil pipe conduits C and C' respectively, above the floor line of the bottom of the casting A, as will be readily understood.

The motor casing B is provided with the usual armature, (not shown) mounted on the shaft D.

In carrying out my invention I employ a standard type of electric motor in which one end cap of the casing is removed and replaced by a casing E which is joined as at B' as shown by Fig. 4 of the drawings. The shaft D is extended by securing thereto a shaft D' on which I have mounted a gear pump element F and an air pump element or rotor G. A gear pump element F' of the same size, meshes with the element F, and a similar air pump element or rotor G' co-acts with the element G to form a blower of the well known "Roots" type. The elements F' and G' are rigidly mounted on a short jack-shaft H, being driven by the gear F, it being noted that said gear elements F and F' are of the same diameter and pitch, serving to rotate the rotor or elements G, G' in timed relation.

The gear and the blower housing comprise casings I, J, K and L respectively, formed as illustrated, said casings E, I, J and K having a passage therethrough for air to form the air conduit M which is in open communication with the air inlets N of the casing B, the said air passage leading to the blower chamber G² and therefrom through the outlet pipe G³ also shown by Fig. 4 of the drawings. A conduit for oil is provided which leads through the casings J, I, E, K and L, said conduit being in open communication through the pipes C and C' with the oil reservoir A³ and with the pump F². Holes L' and L' respectively, lead from the conduit F² to the ends of the main shaft D and the jack shaft H to constantly supply oil to the bearings of said shaft at these points.

The bearings are indicated as at S and the lubricating means above referred to are also seen clearly in Fig. 1 of the drawings.

On the main shaft D there is provided a fan O which delivers air to the blowers and blower chamber under low pressure. A shield P is mounted on the shaft D' and prevents dust or foreign matter from entering into the shaft bearings adjacent thereto. Bolts Q hold the casings L, K, J and I together and pass through the casing E, and connections or unions R are provided to permit the sections to be easily connected and detached from the casing E and reservoir A³.

It will be observed that one side wall of the blower chamber and one side wall of the gear pump is formed by the casing J and that all of said walls which are in contact with an adjacent wall are formed with single plane surfaces which are easy to turn or mill in manufacturing the device, and that easy and perfect assembly of parts are provided for and in addition the construction allows for more or less variation of thickness of the casting or casing J when necessitating a change in thickness should the material be not always uniform.

The operation is as follows:—

Assuming the motor to be running and rotating the shaft D in the direction indicated by the arrows, air is drawn in through the inlets N to and through the air conduit M to blower chamber G² and forced therefrom by the blower through outlet pipe G³, the air pressure in the chamber G² preventing any excess of oil supplied to the journal bearings from escaping into said chamber.

Oil is drawn from the reservoir A³ by the gear pump comprising the two gears F and F'; flowing through the conduit F² and returning to the reservoir through pipe C. Oil from the pump chamber F² finds its way to the bearings of the shaft D and jack shaft H, keeping them perfectly lubricated on the right hand side of the blower, and oil also flows through holes L' and lubricates the end bearings, while the air pressure in the blower chamber G² prevents any excess of oil from flowing into said chamber from either side thereof. The fan increases the volume of air on the suction side of the blower and thus renders the blower more efficient, causing it to deliver a greater volume of air per revolution than it would deliver without the fan. The air flowing through the motor casing keeps the armature cool. The construction is compact, simple and durable and low in cost of construction.

Having thus described my invention I claim as new:—

1. In combination, a motor having a main shaft and a jack shaft, bearings for said shafts, a gear pump for oil and a rotary pump for gas driven by said main shaft, a reservoir for oil, a conduit for oil leading from said reservoir to said oil pump and therefrom to said reservoir, said conduit communicating with said bearings to conduct oil thereto.

2. In combination, a motor having a main shaft and a jack shaft, bearings for said shafts, a gear pump for oil and a rotary pump for gas driven by said main shaft, a reservoir for oil, a conduit for oil leading from said reservoir to said oil pump and therefrom to said reservoir, said conduit communicating with said bearings to conduct oil thereto and a conduit for gas leading from said motor to said gas pump.

3. In combination, a motor having a main shaft and a jack shaft, bearings for said shafts, a gear pump for oil and a rotary pump for gas, each comprising rotable parts mounted on said jack shaft and main shaft and means for driving the jack shaft in timed relation with the main shaft and means for supplying oil from said oil pump to said bearings.

4. In combination, a motor having a main shaft and a jack shaft, bearings for said shafts, a gear pump for oil and a rotary pump for gas, each comprising rotatable parts mounted on said jack shaft and main shaft and means for driving the jack shaft in timed relation with the main shaft and means for supplying oil from said oil pump to said bearings and means for supplying gas under pressure to said gas pump.

5. In combination, a motor having a rotatable shaft, a casing having a rotary pump for gas and a gear pump for oil located therein and driven by said shaft, bearings for said shaft, conduits formed in said casing leading to and from said pumps respectively, and means comprising said oil pump for continuously supplying said bearings with oil when the motor is operating.

6. In combination, a motor having a main shaft and a jack shaft, bearings for said shafts, means for driving said shafts, a rotary oil pump and a rotary gas pump driven by the main shaft, an oil reservoir, a conduit leading from the oil pump and gas pump to the said reservoir, said conduit communicating with the said bearings to conduct oil thereto.

7. In combination, a motor having a main shaft and jack shaft, bearings for said shafts, means for driving said shafts, a rotary oil pump and a rotary gas pump driven by the main shaft, a conduit leading from the oil pump and gas pump to a source of oil and gas supply, said conduit communicating with the bearings to conduct oil thereto.

8. In combination, a motor having a main shaft and jack shaft, bearings for said shafts, meshed gears on the main shaft and the jack shaft, a gear pump for oil and a rotary gas pump driven by the main shaft, an oil reservoir, a conduit leading from the oil pump and gas pump to said reservoir, said conduit being in communication with the ends of said shafts whereby the shaft bearings may be lubricated throughout their length.

9. In combination, an electric motor having a casing open at each end, a shaft extending from the motor and driven thereby, a casing attached to the motor casing, a pump for gas and a pump for oil driven by said shaft, bearings for said shaft, a fan on said shaft, a conduit for air leading through said casings to said gas pump and means for conveying oil to and from said oil pump, shaft bearings and gas pump to lubricate the same.

10. In combination, a motor having a rotatable shaft, a casing having a pump for gas and a pump for oil located therein and driven by said shaft, bearings for said shaft, an oil reservoir below the motor and constituting a support therefor, conduits formed in said casing leading to and from said pumps respectively and means comprising said oil pump for continuously supplying said bearings with oil when the motor is operating.

11. In combination, a motor having a rotatable shaft, a jack shaft, meshed gears between said shafts, a pump for gas and a pump for oil driven by said rotatable shaft, bearings for said shaft, a fan on said shaft, a shield for protecting the bearings of said shaft, an oil reservoir below the motor and constituting a support therefor, a conduit for air leading through the casing of the motor to said fan and said oil and gas pumps and in communication with the said oil reservoir to lubricate the same.

12. In combination, an electric motor having a casing comprising an end wall portion having a conduit therein, the outer side of said end wall being formed with a plane surface, a gear pump for oil comprising a plate having parallel sides formed with plane surfaces and one side of which abuts the plane surface of said end wall of the motor casing; a plate having a plane surface which abuts the plane surface of said gear pump plate and serves as a side wall for the gears of said pump, and having a conduit leading from the exterior wall of the plate to said gear pump; said motor having a shaft which extends through said end wall and plates and drives said pump, and means for holding said plates together and to said end wall of the motor casing, and in detachable relation therewith.

13. In combination, an electric motor having an end wall provided with a plane surface, a casing for pumps comprising a plurality of plates each of which is provided with plane surfaces which are held in abutting relation and in two of which are formed rotary pumps, the adjacent plates serving as side walls therefor, said motor having a shaft which extends through said plates and drives said pumps, and means for holding said plates to said end wall.

14. In combination, a motor having a rotatable shaft, a casing having bearings for said shaft and a conduit for oil leading to the end of said shaft in said casing, a rotary gas pump driven by said shaft, a gear pump for oil driven by said shaft and adapted to pump oil thru said conduit to lubricate said bearings and gas pump.

15. In combination, a motor having a rotatable shaft, a casing having bearings for said shaft and a conduit for oil leading to the end of said shaft in said casing, a rotary gas pump driven by said shaft, a rotary gear pump for oil driven by said shaft and adapted to pump oil thru said conduit to lubricate said bearings and gas pump, and a reservoir for oil in open communication with said conduit at both ends thereof.

In testimony whereof I have affixed my signature.

ALBERT E. GRANT.